US012784430B2

(12) United States Patent

Jo et al.

(10) Patent No.: US 12,784,430 B2
(45) Date of Patent: Nov. 3, 2026

(54) METHOD FOR ANALYZING EXPERIMENTAL DATA RELATED TO QUANTUM SYSTEM BY USING NEURAL NETWORK

(71) Applicant: The Hong Kong University of Science and Technology, Hong Kong (CN)

(72) Inventors: Gyu Boong Jo, Hong Kong (CN); Junwei Liu, Hong Kong (CN); Entong Zhao, Hong Kong (CN); Chengdong He, Hong Kong (CN); Zejian Ren, Hong Kong (CN); Elnur Hajiyev, Hong Kong (CN); Jeongwon Lee, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1170 days.

(21) Appl. No.: 17/847,148

(22) Filed: Jun. 22, 2022

(65) Prior Publication Data

US 2022/0415036 A1 Dec. 29, 2022

Related U.S. Application Data

(60) Provisional application No. 63/214,249, filed on Jun. 23, 2021.

(51) Int. Cl.
*G06V 10/82* (2022.01)
*G01S 17/894* (2020.01)
(Continued)

(52) U.S. Cl.
CPC ............ *G06V 10/82* (2022.01); *G01S 17/894* (2020.01); *G06N 3/045* (2023.01); *G06V 10/764* (2022.01); *G06V 10/776* (2022.01); *G06V 20/70* (2022.01)

(58) Field of Classification Search
CPC .... G06V 10/82; G06V 10/776; G06V 10/764; G06V 10/70; G06V 10/77; G06V 20/70;
(Continued)

(56) References Cited

U.S. PATENT DOCUMENTS

2021/0182721 A1 6/2021 Li et al.
2022/0020115 A1 * 1/2022 Zhang .................. G01J 3/2823
2023/0375399 A1 * 11/2023 Magana-Loaiza .... G01J 1/0238

OTHER PUBLICATIONS

Sinha et al., "Optimization of convolutional neural network parameters for image classification", 2017 IEEE Symposium Series on Computational Intelligence (SSCI), Nov. 27, 2017-Dec 1, 2017, pp. 1-7. (Year: 2017).*

(Continued)

*Primary Examiner* — Hwei-Min Lu
(74) *Attorney, Agent, or Firm* — IDEA Intellectual Limited; Sam T. Yip

(57) ABSTRACT

A method for analyzing experimental data related to quantum system by using neural network by an electronic device is provided. The method includes: generating a training dataset according to experimental data; performing one or more filtering operations on the training dataset to generate one or more filtered training datasets respectively corresponding to the filtering operations; training a first neural network and a second neural network by inputting the original and filtered training datasets; evaluating the first and the second neural network; obtaining one or more classification accuracies of the first and the second neural network; identifying the differences between pairs of classification accuracies; and determining impact level of each information preserved or removed by each of the filtering operations according to the differences.

20 Claims, 10 Drawing Sheets
(8 of 10 Drawing Sheet(s) Filed in Color)

(51) Int. Cl.
*G06N 3/045* (2023.01)
*G06V 10/764* (2022.01)
*G06V 10/776* (2022.01)
*G06V 20/70* (2022.01)

(58) Field of Classification Search
CPC .... G01S 17/894; G06N 3/045; G06N 3/0464; G06N 3/048; G06N 3/04; G06N 3/02; G06N 3/09; G06N 3/08
USPC ............................................... 706/20, 16, 15
See application file for complete search history.

(56) References Cited

OTHER PUBLICATIONS

Luo et al., "How Does the Data set Affect CNN-based Image Classification Performance?", The 2018 5th International Conference on Systems and Informatics (ICSAI), Nov. 10-12, 2018, pp. 361-366. (Year: 2018).*
Picard et al., "Deep Learning-Assisted Classification of Site-Resolved Quantum Gas Microscope Images", Measurement Science and Technology, vol. 31, No. 2, Nov. 5, 2019, pp. 1-12. (Year: 2019).*
Sonderhouse et al., "Thermodynamics of a deeply degenerate SU(N)-symmetric Fermi gas", arXiv:2003.02408v2, Mar. 7, 2020, pp . 1-10. (Year: 2020).*
Ahmed et al., "The Impact of Filter Size and No. of Filters on Classification Accuracy in CNN", 2020 International Conference on Computer Science and Software Engineering (CSASE), Apr. 16-18, 2020, pp. 88-93. (Year: 2020).*
Miles et al., "Correlator Convolutional Neural Networks: An Interpretable Architecture for Image-like Quantum Matter Data", arXiv:2011.03474v1, Nov. 6, 2020, pp. 1-20. (Year: 2020).*
Jung et al., "Deep learning enhanced individual nuclear-spin detection", npj Quantum Information 7, Article No. 41, Feb. 23, 2021, pp. 1-9. (Year: 2021).*
Moller et al., "Thermometry of one-dimensional Bose gases with neural networks", arXiv:2105.03127v1, May 7, 2021. (Year: 2021).*
Guo et al., "Machine-learning enhanced dark soliton detection in Bose-Einstein condensates", Machine Learning: Science and Technology, vol. 2, No. 3, Jun. 15, 2021, pp. 1-11. (Year: 2021).*
Miles et al., "Correlator convolutional neural networks as an interpretable architecture for image-like quantum matter data", Nature Communications, 12, Article No. 3905, Jun. 23, 2021, pp. 1-7. (Year: 2021).*
Entong Zhao et al., "Heuristic machinery for thermodynamic studies of SU(N) fermions with neural networks," Nature Communications, 2021, 12:2011, pp. 1-9.
Entong Zhao et al., "Heuristic machinery for thermodynamic studies of SU(N) fermions with neural networks," arXiv:2006.14142v2, 2020, pp. 1-11.
Yadong Wu et al., "Active Learning Approach to Optimization of Experimental Control," arXiv:2003.11804v2, 2020, pp. 1-6.
Annabelle Bohrdt et al., "Classifying Snapshots of the Doped Hubbard Model with Machine Learning," arXiv:1811.12425v1, 2018, pp. 1-9.
Giuseppe Carleo et al., "Constructing exact representations of quantum many-body systems with deep neural networks," arXiv:1802.09558v1, 2018, pp. 1-31.
Kelvin Ch'ng et al., "Machine Learning Phases of Strongly Correlated Fermions," Physical Review X 7, 031038, 2017, pp. 1-9.
Gal Ness et al., "Single-exposure absorption imaging of ultracold atoms using deep learning," arXiv:2003.01643v2, 2020, pp. 1-7.

* cited by examiner

METHOD FOR ANALYZING EXPERIMENTAL DATA RELATED TO QUANTUM SYSTEM BY USING NEURAL NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to analyze experiment data related to quantum system, and more particularly, to a method and device for classifying particles in the quantum system (e.g., SU(N) fermion) and exploring thermodynamics from density profile of those particles by performing image analyzing on the experiment data of those particles using neural network.

BACKGROUND OF THE INVENTION

Pronounced effects include atom number and fugacity, which can be extracted from simple analysis or even distinguishable with human eyes. Less-pronounced effects include compressibility and Tan's contact, which is challenging to extract with conventional method. Although less-pronounced effects are hard to extract, they are very important physical properties. Tan's contact is a central quantity which governs many physical observables such as the momentum distribution, the energy, the pressure and a variety of spectroscopies. The atom number fluctuation/compressibility in fermions is also a key quantity, which reflects the Pauli exclusion principle.

In other words, it is essential, for people who is skilled in the art, to study how to efficiently probe the subtle effects directly related to physical observables and to understand physics behind from ordinary experimental data.

SUMMARY OF THE INVENTION

In accordance to one aspect of the present invention, a computer-implemented method for analyzing experimental data related to quantum system by using neural network by an electronic device is provided. The method includes: generating a training dataset according to experimental data; performing one or more filtering operations on the training dataset to generate one or more filtered training datasets respectively corresponding to the filtering operations; training a first neural network by inputting the training dataset into the first neural network; training a second neural network by inputting the filtered training datasets into the second neural network; inputting a test dataset into the trained first neural network, so as to obtain a standard classification accuracy of the trained first neural network, wherein the test dataset is generated from further experimental data; performing the one or more filtering operations on the test dataset to generate one or more filtered test datasets; inputting the filtered test datasets into the trained first neural network, so as to obtain one or more first classification accuracies respectively corresponding to the filtered test datasets; inputting the filtered test datasets into the trained second neural network, so as to obtain one or more second classification accuracies respectively corresponding to the filtered test datasets; identifying the differences between first pairs of the standard classification accuracy and the first classification accuracies, second pairs of the standard classification accuracy and the second classification accuracies and third pairs of the first classification accuracies and the second classification accuracies; and determining impact level of each information preserved or removed by each of the filtering operations according to the differences, wherein information which has higher impact level more affect accuracy of the first neural network and the second neural network, such that, while generating the experimental data in the future, one or more the information with higher impact level serve as a guidance for the high-sensitivity image analysis of the quantum system with the neural network.

In accordance with another aspect of the present invention, an electronic device for analyzing experimental data related to quantum system by using neural network is provided, and the electronic device includes one or more processors configured to execute machine instructions to implement the method described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention are described in more details hereinafter with reference to the drawings, in which.

DETAILED DESCRIPTION

Figure 1:
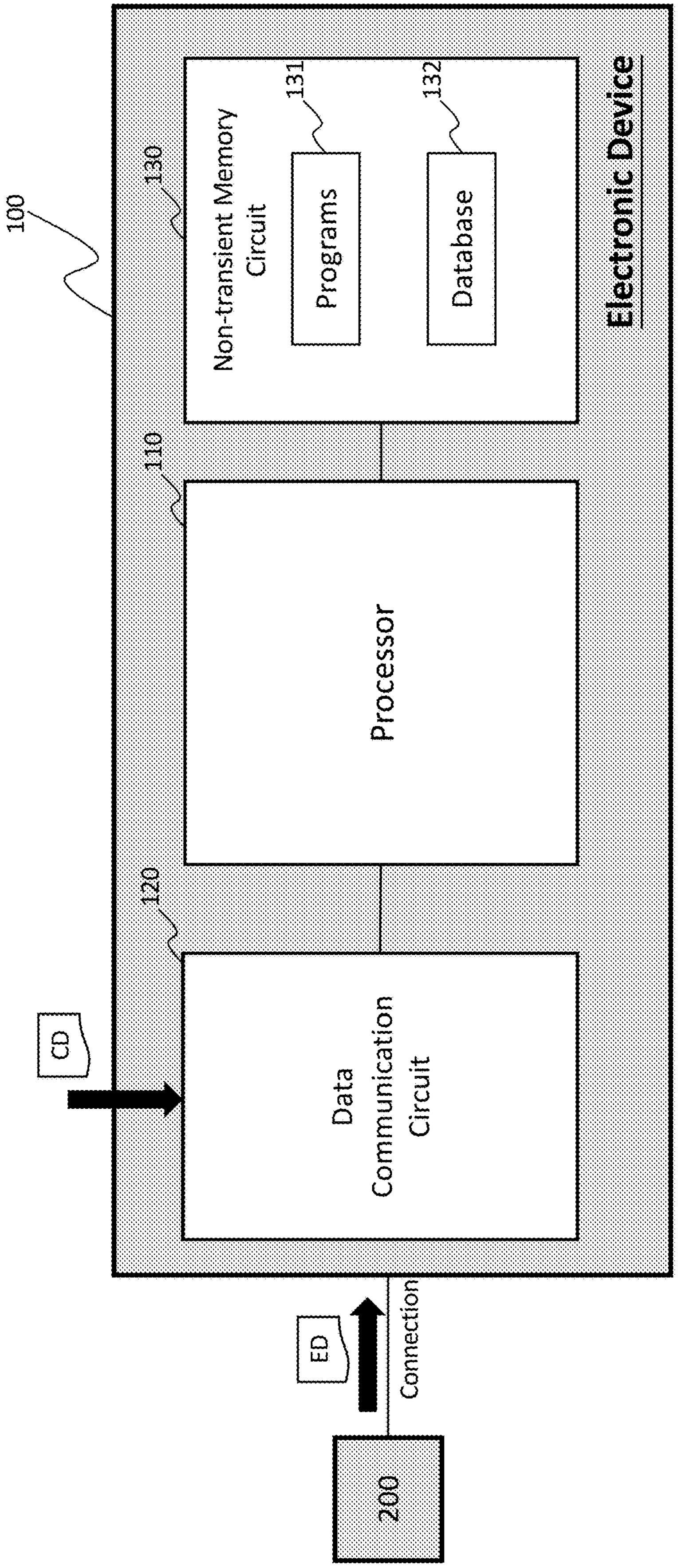
FIG. 1 depicts a block diagram illustrating an electronic device in accordance with one embodiment of the present invention.

In the following description, method and electronic device for applying machine learning analysis to image analysis in quantum gas experiments, while one of the applications of this invention is to classify the SU(N) gas and explore the thermodynamics in the density profile of SU(N) gas, are set forth as preferred examples. It will be apparent to those skilled in the art that modifications, including additions and/or substitutions may be made without departing from the scope and spirit of the invention. In other words, the conventional problem is that it is hard to probe the subtle effects directly related to spin multiplicity N and to understand physics behind from the experimental density profiles of SU(N) fermions. However, by applying the provided method and electronic device, a thermodynamic compressibility from density fluctuations within the single image can be directly measured. Although it takes momentum distribution of SU(N) Fermi gases in bulk as an example in the invention, it can be easily generalized to other quantum system, such as studying the thermometry of degenerate Fermi gas and detecting the temperature dependent physical properties. Specific details may be omitted so as not to obscure the invention; however, the disclosure is written to enable one skilled in the art to practice the teachings herein without undue experimentation.

Multi-component fermions with SU(N)-symmetric interactions hold a singular position as a prototype system for understanding quantum many-body phenomena in condensed matter physics, high-energy physics, and atomic physics. In condensed matter, e.g., interacting electrons usually possess SU(2) symmetry, whereas there are emergent higher spin symmetries for the low-energy property of systems as the SU(4) symmetry in graphene due to the combination of spin and valley degrees of freedom. In quantum chromodynamics, nuclear interactions are represented by SU(3) symmetry. In the past decades, developments in cooling and trapping of alkaline-earth-like fermions have opened possibilities to achieve even higher spin symmetries, owing to their distinctive inter-particle interactions, and thus provided ideal platforms to study various SU(N) fermionic systems. Although the role of SU(N) symmetry has been probed in optical lattices, the comprehensive characterization of interacting SU(N) fermions in bulk, wherein the SU(N) Fermi liquid description is valid, has still remained challenging. One of the bottlenecks is that the interaction-induced effect enhanced by enlarged SU(N) symmetry is sufficiently pronounced by the tight confinement only in one-dimensional (1D) or two-dimensional (2D) cases. It is only recently that thermodynamics and contact interactions are investigated in three-dimensional 3D SU(N) fermions, but a comprehensive experimental study of SU(N) fermions still remains to be done. Developing experimental techniques or designing approaches to uncover the subtle connection of various spin multiplicity-dependent properties with the available experimental measurements in SU(N) interacting fermions is crucial to advance the understanding of SU(N) symmetry and the corresponding many-body phenomena.

The provided method uses machine learning (ML) as a guidance for the image analysis in quantum gas experiments and demonstrate the thermodynamic study of SU(N) fermions. The main idea of this heuristic approach can be summarized into a three-step process as follows: (1) manually control the amount of information within each of the images fed to the neural networks (NNs) during the training or testing processes; (2) determine the relative importance of the given (or removed) information based on the changes in the accuracy of the training or testing processes; and (3) identify the connection between the information and specific physical observables, so as to further focus analytical efforts on.

To demonstrate the proposed method concretely, density profile of SU(N) Fermi gases is taken as an example and show how the density profile can guide the analytical studies. Besides the pronounced effects such as atom number and fugacity, the connection between the spin multiplicity and less-pronounced features is explored, such as compressibility and Tan's contact in the density profile. Based on this method, one can extract less-pronounced effects even in the most ordinary density profiles and successfully reveal thermodynamic features, which depend on the spin multiplicity, from density fluctuations and high-momentum distributions. This allows one to detect the spin multiplicity with a high accuracy ~94% in a single snapshot classification of SU(N) density profiles.

To further verify the validity of the connection between the less-pronounced effects and physical observable, the thermodynamic compressibility is measured from density fluctuations within a single image benchmarking ML processes, which turns out to be in very good agreement with SU(N) Fermi liquid descriptions. Besides providing general-purpose methods to extract various less-pronounced effects and consolidate the understanding of SU(N) fermions, recent ML studies of quantum many-body physics are complemented by the provided method to explore the underlying physics. More details are described below.

Referring to FIG. 1 for the following description. In accordance to various embodiments of the present invention, an electronic device 100 for analyzing experimental data related to quantum system by using neural network includes a processor 110, a data communication circuit 120, and a non-transient memory circuit 130.

The data communication circuit 120 is configured to establish a connection with other electronic device (e.g., an experimental device) 200. The non-transient memory circuit 130 is configured to store programs 131 (or machine instructions 131) and to host the database 132. The database 132 may be used to store trained neural network (including the hyper-parameters thereof), experiment data ED, control data CD, and/or analysis result (e.g., outputted classification results, or called as result data RD).

The processor 110 executes the machine instructions 131 to implement methods provided by the presented disclosure. The foregoing neural network is executed by the processor 110.

The electronic device 100 can receive experimental data ED from other electronic device 200 via the established connection. The control data CD may comprise data for training/testing the neural network and predetermined parameters.

The experimental data is prepared by the following steps: preparing degenerate SU(N) Fermi gases with predetermined value of N respectively in optical traps, wherein N=1, 2, 5, 6; and taking, after time-of-flight expansion, spin-insensitive absorption images of the degenerate SU(N) Fermi gases as experimental images, so as to record density profiles of the degenerate SU(N) Fermi gases, wherein each experimental image shows atoms momentum distribution via each experimental image's density profile. Each experimental image is an image generated by performing time-of-flight (TOF) experiment on a SU(N) fermion. The size of the experimental image inputted to the neural network is set as 201×201 pixels, and the predicted classification result comprises one of following classes: SU(1), SU(2), SU(5) and SU(6), and outputs a probability of the outputted class.

In more detail, the experimental measurements (experimental data) with appropriate labels are prepared. Here, the density profile is selected for studying SU(N) Fermi gases, and the corresponding spin multiplicity of each of the SU(N) Fermi gases is indicated by the label. In the experiment, a degenerate SU(N) Fermi gas with N=1, 2, 5, 6 is prepared in an optical trap and the density profile is recorded by taking spin-insensitive absorption images after time-of-flight (TOF) expansion, yielding the momentum distribution. The spin multiplicity is confirmed by optical "Stern Gerlach" measurements. In principle, the density profile contains the momentum-space information of SU(N)-interacting fermions, which reflects various thermodynamic observables, such as Tan's contact or the compressibility, which is the underlying reason for the success of using ML techniques to detect the spin multiplicity. However, the effect of spin multiplicity on the momentum distribution is small compared to other features such as the fugacity and atom number because of small interaction strength.

Figure 3A:
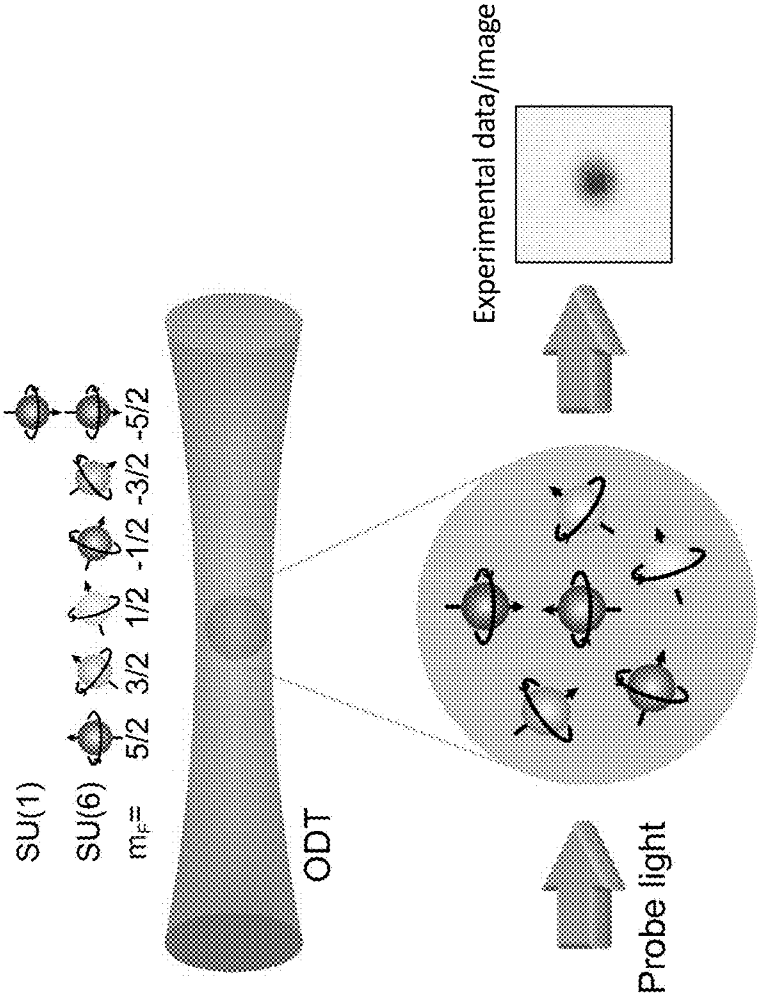
FIG. 3A depicts a schematic diagram of preparing SU(N) gases in the optical dipole trap (ODT)

Referring to FIG. 3A (sample preparation), a balanced ultracold Fermi gas of $^{173}Yb$ atoms with SU(N) symmetric interactions as large as N=6 is prepared. The momentum distribution of the SU(N) Fermi liquid of $^{173}Yb$ atoms with tunable spin configuration is recorded. The collected datasets are then fed into the NN as the input images for classification. By loading a laser-cooled, six-component Fermi gas, where the nuclear spin states are equally populated, into a three-dimensional optical dipole trap (ODT). The atoms are further evaporatively cooled in the ODT to a temperature range of 0.2-1.0 $T/T_F$, where $T_F$ is the Fermi temperature. During the evaporation, different spin configurations are prepared via an optical pumping process using a narrow line-width transition of $^1S_0(F=5/2)\rightarrow{}^3P_1(F'=7/2)$ at a wavelength of $\lambda$=556 nm. The $\sigma^{\pm}$-polarized pumping light removes unwanted mF states of the ground manifold of $^1S_0$ and produces a Fermi gas with tunable SU(N) interactions, as the nuclear spin relaxation rates are negligible in the performed experiment. After the evaporative cooling, the ODT is further ramped up in 60 ms, to obtain large-enough trap frequencies $(\omega_x, \omega_y, \omega_z)=2\pi\times(1400, 750, 250)$ Hz before 4 ms of time-of-flight expansion. The density distributions is measured by taking absorption images using a spin-insensitive $^1S_0(F=5/2)\rightarrow{}^1P_1(F'=7/2)$ transition at 399 nm. The experimental images are taken in random order with respect to their spin configurations, so as to avoid the possibility of a classification based on fluctuations in the background. The spin configuration of the sample can be monitored by the optical Stern Gerlach measurement. In general, the atom number of different spin states has a fluctuation of ±2% of the total atom number.

Therefore, the dataset should be prepared in such a way that images are indistinguishable based on the pronounced features (i.e., atom number or temperature), which forces the NN to seek for less-pronounced features. Less-pronounced effects include compressibility and Tan's contact, which is challenging to extract with conventional method. Although less-pronounced effects are hard to extract, they are very important physical properties. Tan's contact is a central quantity which governs many physical observables such as the momentum distribution, the energy, the pressure and a variety of spectroscopies. The atom number fluctuation/compressibility in fermions is also a key quantity, which reflects the Pauli exclusion principle.

The datasets are post-selected and possible correlations between spin multiplicity and atom number or temperature are minimized. For example, a post-selection procedure with Gaussian fitting is used to select data with similar density profile and consequently make the dataset indistinguishable with simple analysis.

More specifically, all snapshots are first preprocessed by the fringe removal algorithm reported in Song, B. et al. [Effective statistical fringe removal algorithm for high-sensitivity imaging of ultracold atoms. Phys. Rev. Appl. 14, 034006 (2020)]. Then, cropped images are inputted into the NN for further classification. For SU(N) data, it is natural to prepare the same number of atoms per spin at constant $T/T_F$, in which the normalized density profile is the same for different SU(N) cases. In the embodiment, however, it is found that the diffraction of the imaging light induces fringe patterns that depend on the total atom number in the experiment. One can normalize the image by the total atom number, but it inevitably changes the level of background noise. Therefore, the total atom number is kept unchanged, otherwise the NN uses the background fringe patterns or noises to classify the SU(N) data. In the experiment, 200 images are post-selected per each SU(N) class by using a Gaussian fitting, which allows to obtain samples with similar profiles but different $T/T_F$. If different SU(N) gases are kept at constant $T/T_F$, the profiles are identical in the unit of $k_F$, instead of pixel. Subsequently, 75% of the data (e.g., training dataset) is used for training NNs and the remaining (e.g., test dataset) is for test.

Figure 3B:
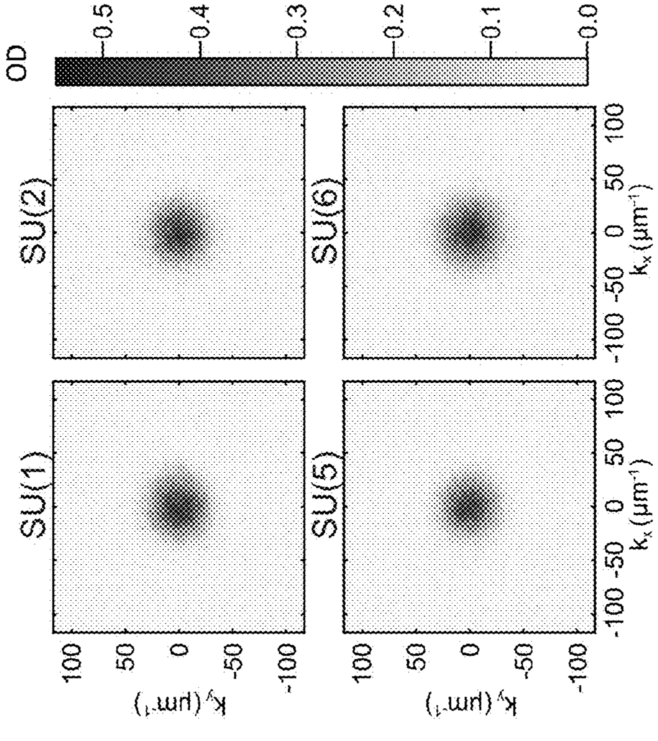
FIG. 3B depicts a schematic diagram of experimental images of the SU(N) gases.
Figure 3C:
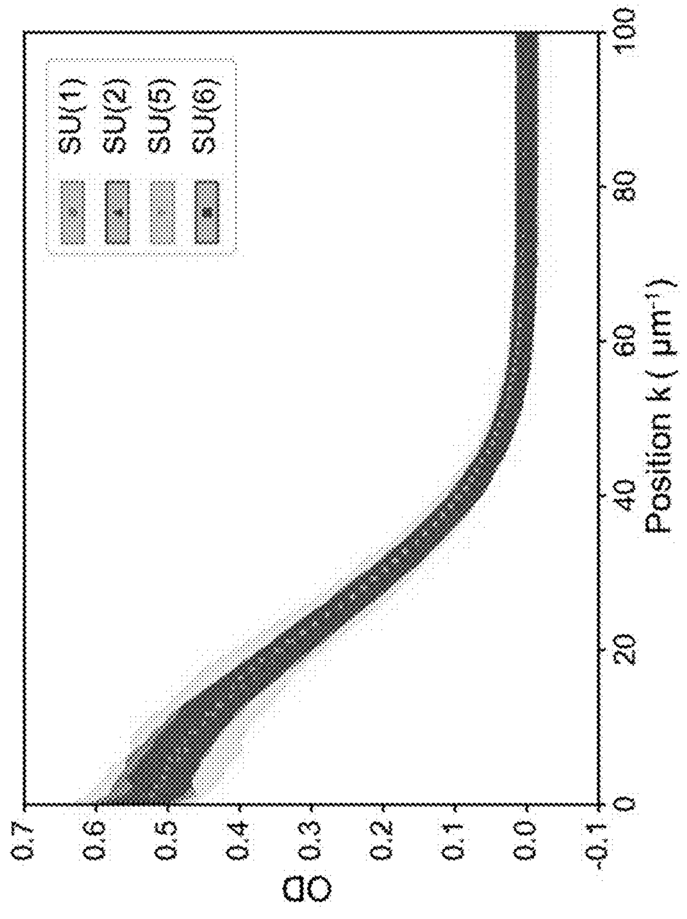
FIG. 3C depicts a schematic diagram of radially averaged optical density (OD) profiles in different SU(N) gases.

In the embodiment, the density profiles with the interaction parameters $k_F a_s \simeq$=0.3 are focused on, where $k_F$ is the Fermi wave vector and $a_s$ the scattering wavelength. The profiles only selected based on similarities in widths of Gaussian fitting of the density profiles to result in indistinguishable momentum profiles as shown in FIG. 3B and FIG. 3C. In an experiment, 200 density profiles are collected for each class of SU(1), SU(2), SU(5), and SU(6) (FIG. 3B). 150 of them (training dataset) are fed to train the NNs by implementing the supervised ML techniques with spin multiplicity as labels and use the remaining 50 profiles (test dataset) to evaluate the classification accuracy that is defined as the ratio of number of samples with predictions matching true labels to the total sample number. FIG. 3C shows radially averaged optical density (OD) profiles in different SU(N) gases. The shaded region represents the fluctuation of the density profiles.

Figure 2:
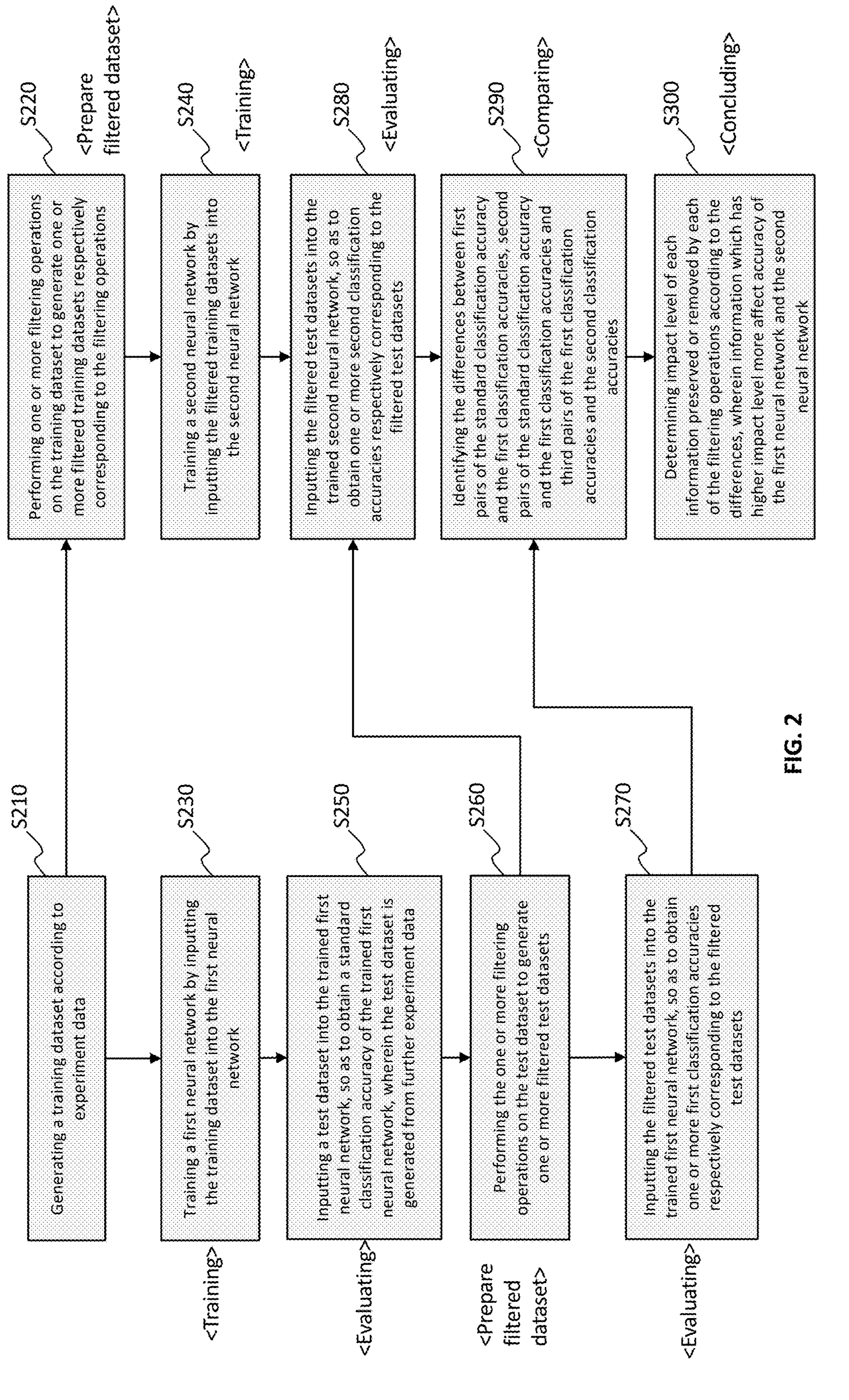
FIG. 2 depicts a flowchart of analyzing experimental data related to quantum system by using neural network.

Referring to FIG. 2, in step S210, the processor 110 generates a training dataset according to experiment data. Specifically, regarding each experimental image of the experimental data, identifying value of N of the degenerate SU(N) Fermi gas corresponding to the taken experimental image; generate a label of the taken experimental image according to the identified value of N; and integrating the generated label and the taken experimental image into the training dataset.

The density profile of each experimental image contains momentum-space information of the degenerate SU(N) Fermi gases, and the which momentum-space information reflects thermodynamic observables comprising Tan's contact and compressibility, such that spin multiplicity of each of the degenerate SU(N) Fermi gases is predicted according to the thermodynamic observables.

Furthermore, in step S220, the processor 110 performs one or more filtering operations on the training dataset to generate one or more filtered training datasets respectively corresponding to the filtering operations.

The filtering operations includes: a binned image operation; a radially averaged image operation; a Fermi-Dirac fitting profile operation; a Gaussian fitting profile operation; a low momentum mask operation; and a high momentum mask operation.

In step S230, the processor 110 trains a first neural network by inputting the training dataset into the first neural network. Furthermore, in step S240, the processor 110 trains a second neural network by inputting the filtered training datasets into the second neural network. It should be mentioned that the structures of the first neural network and the second neural network are the same, but they are trained by different dataset.

Figure 3D:
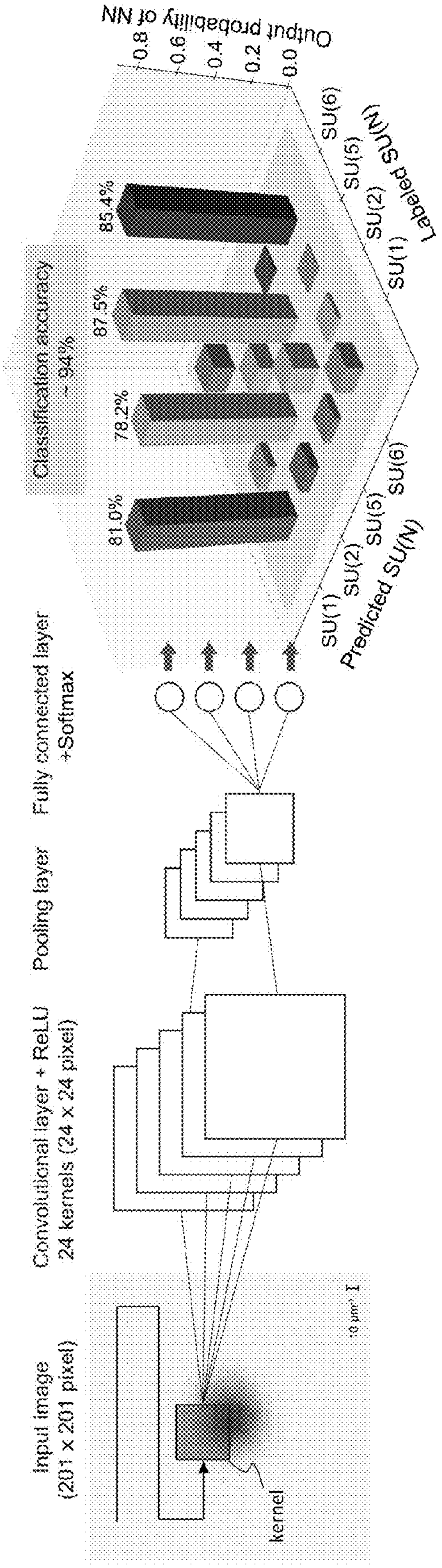
FIG. 3D depicts a schematic diagram of operation flow, structure, and outcome of provided neural network.

To maximize the accuracy of NNs, an architecture of convolutional NNs (CNNs) is chose since it is suited to explore the less-pronounced effects in an image, as shown in FIG. 3D. By choosing the suitable structures and parameters in the CNNs, a very high accuracy ~94%, which is much better than the random guess (25%), can be implemented. Moreover, it is worth to emphasize that the remarkably high accuracy ~94% of NNs is achieved by using only a single snapshot of the density profiles. All these results indicate that there are detectable, less-pronounced features in a single snapshot of density profile.

In the embodiment, a supervised learning/training is performed on the provided neural network, such that the NN can find a correspondence rule between the inputted experimental image and the corresponding label, and it allows to predict the labels of data beyond the training dataset.

Convolutional neural network. Machine learning (ML) techniques used in the embodiment are based on CNNs, which takes a supervised learning approach for classification task. NNs, inspired by the biological NNs that constitute animal brains, are composed of a series of artificial neurons, among which the connection is a real-valued function $f$: $R^k \rightarrow R$, parameterized by a vector of weights $(w_1, w_2, \ldots, w_i, \ldots) = w \in R^k$ and the activation function $\Phi$: $R \rightarrow R$, given by $$f(x) = \phi(w \cdot x) \text{ with } x = (x_1, \ldots, x_i, \ldots) \in R^k.$$

By combining the artificial neurons in a network or in a layer of network, NNs are obtained. A CNN has one or more convolutional layers where neurons are arranged in two dimensions, providing an efficient way of detecting the spatial structure. The convolutional layer first accepts an input 2D image from the previous layer or the whole NN. Then, the kernel of the convolutional layer slides (i.e., convolve) across the width and height of the input image, with dot products between the kernel and the input being computed. Consequently, a 2D feature map in which each pixel is the response at the corresponding position is obtained. If the convolutional layer has N different kernels, the same procedure will be repeated for each kernel and finally N 2D feature maps will be produced. These 2D feature maps will then be loaded into the next layer as input. N is predetermined as 24, but not limited hereto.

Referring to FIG. 3D, the experimental images of SU(N) gases are loaded into the neural network with one single convolutional layer. The black line and window represent how the kernel slides across the image. The output layer classifies the image into one of the class (i.e., SU(1), SU(2), SU(5), SU(6)) resulting in a classification accuracy around 94%. For each input image, NN outputs probabilities of different SU(N) with the highest value of the correct class. The output probabilities of NN are averaged over the test dataset.

The proposed NN (e.g., the first neural network or the second neural network) includes: an input layer, wherein an experimental image of the training dataset, the filtered training datasets, the test dataset and the filtered test datasets is inputted to the first neural network or the second neural network by the input layer; a convolutional layer, connected from the input layer, comprising 24 different kernels, wherein size of each kernel is set to 24, and a stride of each kernel is set to 1; an activation function layer, connected from the convolutional layer, wherein activation function of the activation function layer is ReLU function; an average pooling layer, connected from the activation function layer, wherein size of pooling area is 2×2 and stride of the pooling area is 1; a dropout layer, connected from the average pooling layer, wherein dropout percentage is 50%; a fully connected layer, connected from the dropout layer, comprising 4 neurons; a further activation function layer, connected from the fully connected layer, wherein activation function of the further activation function layer is Softmax function; and an output layer, wherein the output layer outputs a predicted classification result. size of the experimental image is 201×201 pixels (the invention is not limited by this size), and the predicted classification result comprises one of following classes: SU(1), SU(2), SU(5) and SU(6), and outputs a probability of the outputted class.

For example, the CNNs used in the embodiment can be realized by using the Tensorflow in Python. The concrete parameters taken in the embodiment are listed in Table 1 below.

TABLE 1

Network architecture and parameters

| Layer | Layer Name | Function | Description |
|---|---|---|---|
| 1 | Input | Image input | 201 × 201 pixels image |
| 2 | Convolutional layer | Convolution | 24 different 24 × 24 convolutions with stride (1,1) |
| 3 | ReLU | Activation function | ReLU function |
| 4 | Pool layer | Average pooling | 2 × 2 with stride (1,1) |
| 5 | Dropout | Dropout | 50% Dropout |
| 6 | Fully connected layer | Fully connected | Fully connected layer with 4 neurons |
| 7 | Softmax | Activation function | Softmax function |
| 8 | Output | Classification output | Probability with classes N = 1, 2, 5, 6 |

To train the network on the data with different spin configurations, the CNN is compiled with a cross-entropy loss function. During the training process, the weights of model are updated based on Adam algorithm, to minimize the loss function with a learning rate of $1\times10^{-4}$, which is a hyper-parameter that controls how much the network changes the model each time. The maximum training epochs are limited to 1000, and the accuracy and loss are monitored during the training process for selecting the model with best performance. After full training, the trained CNN is evaluated by the test dataset.

The performance of trained NNs is characterized by obtaining the overall classification accuracy, which is defined as the ratio of number of samples with predictions matching true labels to the total sample number. For one single image loaded into the NNs, e.g., the softmax activation function normalizes the output values $$\{\sigma_c\} \text{ by } P(c) = e^{\sigma_c} \Big/ \sum_{c=1}^{4} e^{\sigma_c},$$

which allows a probabilistic interpretation for the different classes denoted by the subscript c. When calculating the classification accuracy, the class with highest probability P(c) is selected as the predicted result (prediction) from NNs. As a complementary analysis of NNs, an output probability matrix that hints how the NNs perform among different classes is also evaluated, such as that shown in FIG. 3D and FIG. 5. In the probability matrix, every element $A_{i,j}$ represents the probability P(c) averaged over the results for all images with the true label j and prediction i.

Return to FIG. 2, after the first neural network is well trained by the training dataset, in step S250, the processor 110 inputs a test dataset into the trained first neural network, so as to obtain a standard classification accuracy of the trained first neural network, wherein the test dataset is generated from further experiment data. During the training, the loss function and classification accuracy is monitored for training dataset after every epochs. The maximum training epochs are limited to 1000 and if the loss function reached the lowest value and cannot be further reduced within the maximum training epochs, the training procedure stops and the network with lowest loss function will be further evaluated by the test dataset. If the test accuracy is high enough (>90%), the network is well trained.

Next, in step S260, the processor 110 performs the one or more filtering operations on the test dataset to generate one or more filtered test datasets. Each of the training dataset, the filtered training datasets, the test dataset, and the filtered test datasets includes one or more experimental images and one or more labels respectively corresponding to the experimental images, wherein each of the labels indicates a class to which the corresponding experimental image belongs.

Figure 4A:
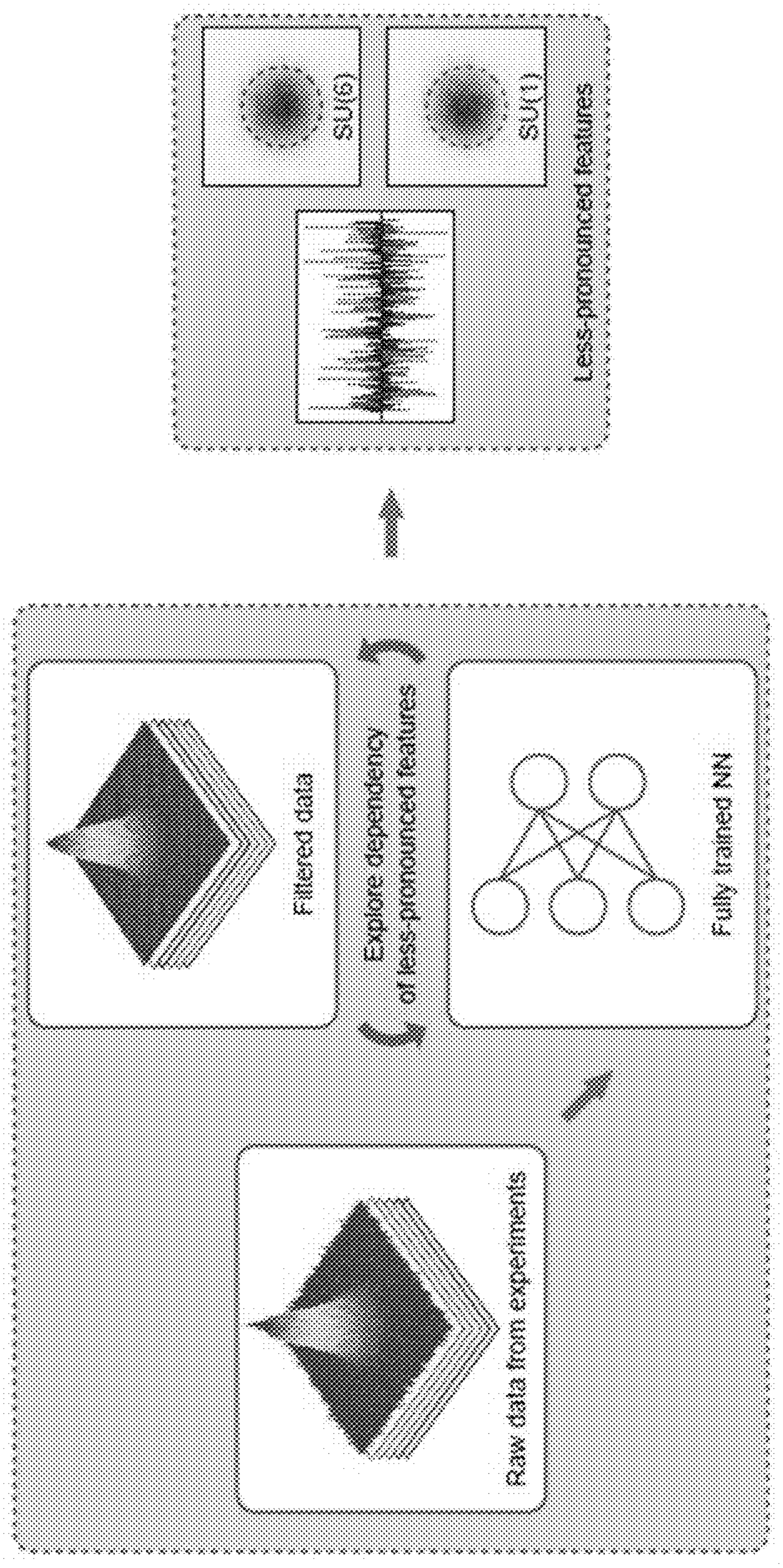
FIG. 4A depicts a schematic diagram of uncovering less-pronounced effects/features of the experimental images of the SU(N) gases.

The attributes processed by the well-trained NNs are analyzed and the less-pronounced effects determined by the spin multiplicity are extracted step by step. Due to the limited interpret-ability of NNs, it is usually difficult to identify what kinds of features the NNs use for classification. In the provided method, parts of the density profile are examined for finding the correlation with the spin multiplicity as described in FIG. 4A.

In the embodiment, for studying the interacting SU(N) fermions, non-interacting fermions and the associated energy (length) scale are used in choosing various filters (filtering operations) in the momentum space.

To do this, the experimental images are manipulate and the classification accuracy of the manipulated images is checked. As different information is removed in different types of manipulated/filtered images which is generated by different types of filtering operations, the classification accuracy will decrease with different amount, which will unfold what kind of information is more important (has more impact level) for classification. In other words, remove different information in different types of images to find out which information affects/decreases the classification accuracy while raw data is original data with all the information reserved.

For example, the information removed by different filtering operations includes: in the Fermi-Dirac fitting profile operation or the Gaussian fitting profile operation, any information except for fitting parameters are removed; in the radially averaged image operation, information of azimuthal density fluctuation is removed and most of the high momentum information is also removed; in the low momentum mask operation, information located at low momentum region is removed, wherein a central mask covers from the center to a cut-off circle of the experimental image, and the cut-off circle has radius of predetermined cut-off momentum $k_c$, wherein atom density of the center of the experimental image is largest; in the high momentum mask operation, information located at high momentum region is removed, wherein an edge mask covers from the edge to the cut-off circle of the experimental image; and in the binned image operation, information of density fluctuation is partially removed.

Figure 4B:
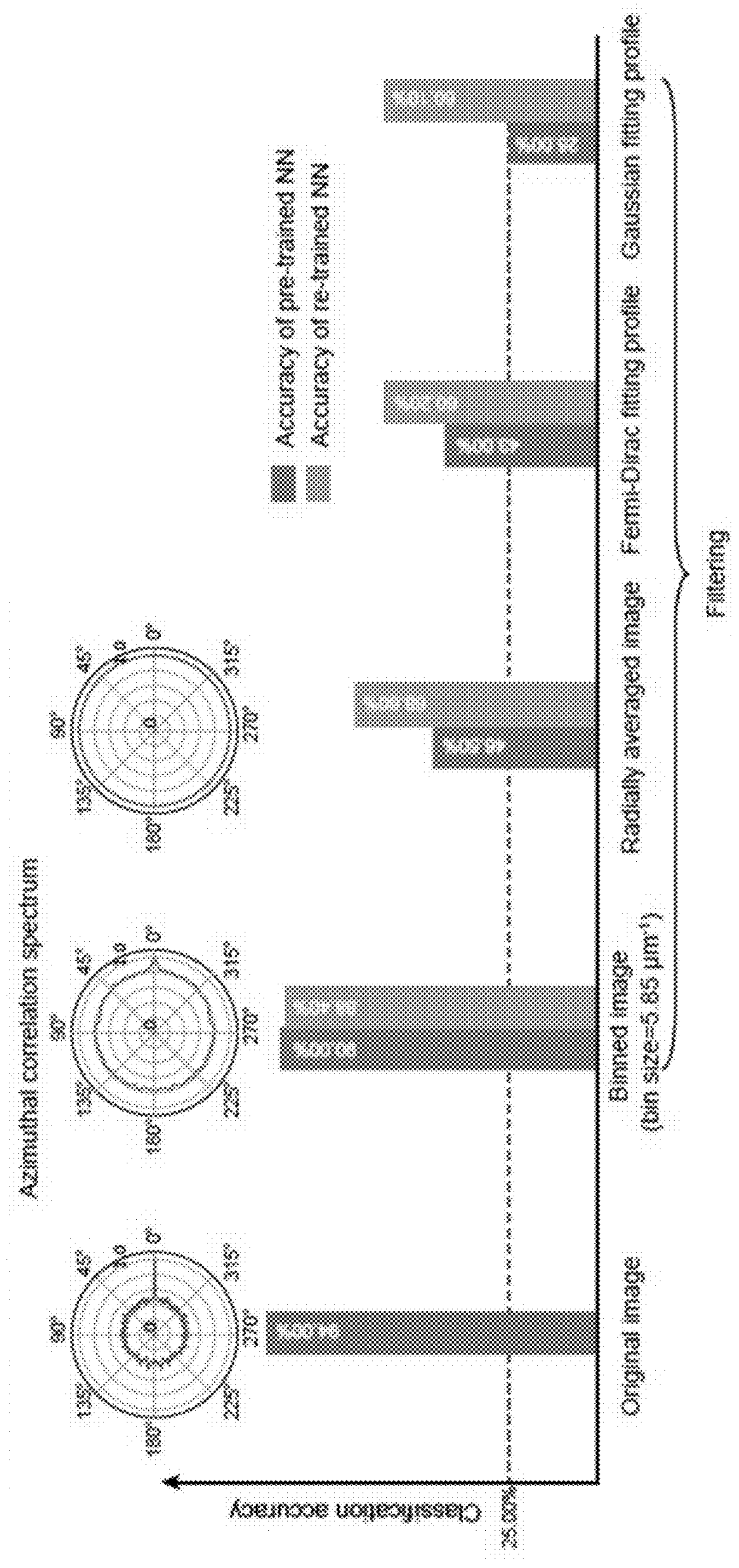
FIG. 4B depicts a schematic diagram of differences of classification accuracies of original experimental image and filtered experimental images indicate impact levels of different filtering operations.

In FIG. 4B, binned images, radially averaged images, Fermi-Dirac fitting profile and Gaussian fitting profile are used to generate filtered images. In FIG. 5, low-momentum and high-momentum masks are used to generate the filtered images. Procedure to obtain these filtered images are mentioned in manipulation of SU(N) data section. In different type of filtered data, different kinds of information will be removed, while the raw data is original data with all the information reserved. For example, in the radially averaged image, the azimuthal fluctuation will be removed; in Fermi-Dirac/Gaussian fitting profile, the raw data is fit with these distributions and then the fake images are generated based on the fitting parameters, therefore, any information except for fitting parameters will be removed.

As shown in FIG. 4B, the whole image is replaced first with the Gaussian and Fermi-Dirac fitting profile to do the test. It turns out that the classification accuracy significantly decreases for both cases and the accuracy drop of the Gaussian fitting profile is even more, which implies the Fermi-Dirac type preserves the characteristics of the original profile better than the Gaussian fit. The variations in accuracies are further tested by replacing profiles with radially averaged profiles, which results in test accuracies higher than the Fermi-Dirac fitting cases. However, the differences in accuracies between the radially averaged and Fermi-Dirac are much smaller compared to the differences between Fermi-Dirac and Gaussian, suggesting the SU(N)-dependent modifications of the Fermi-Dirac distribution to be small. The Fermi-Dirac distribution is an ideal model for non-interacting gas, so there may be potential SU(N)-dependent modification. However, from the result, this kind of modification is small.

Figure 7:
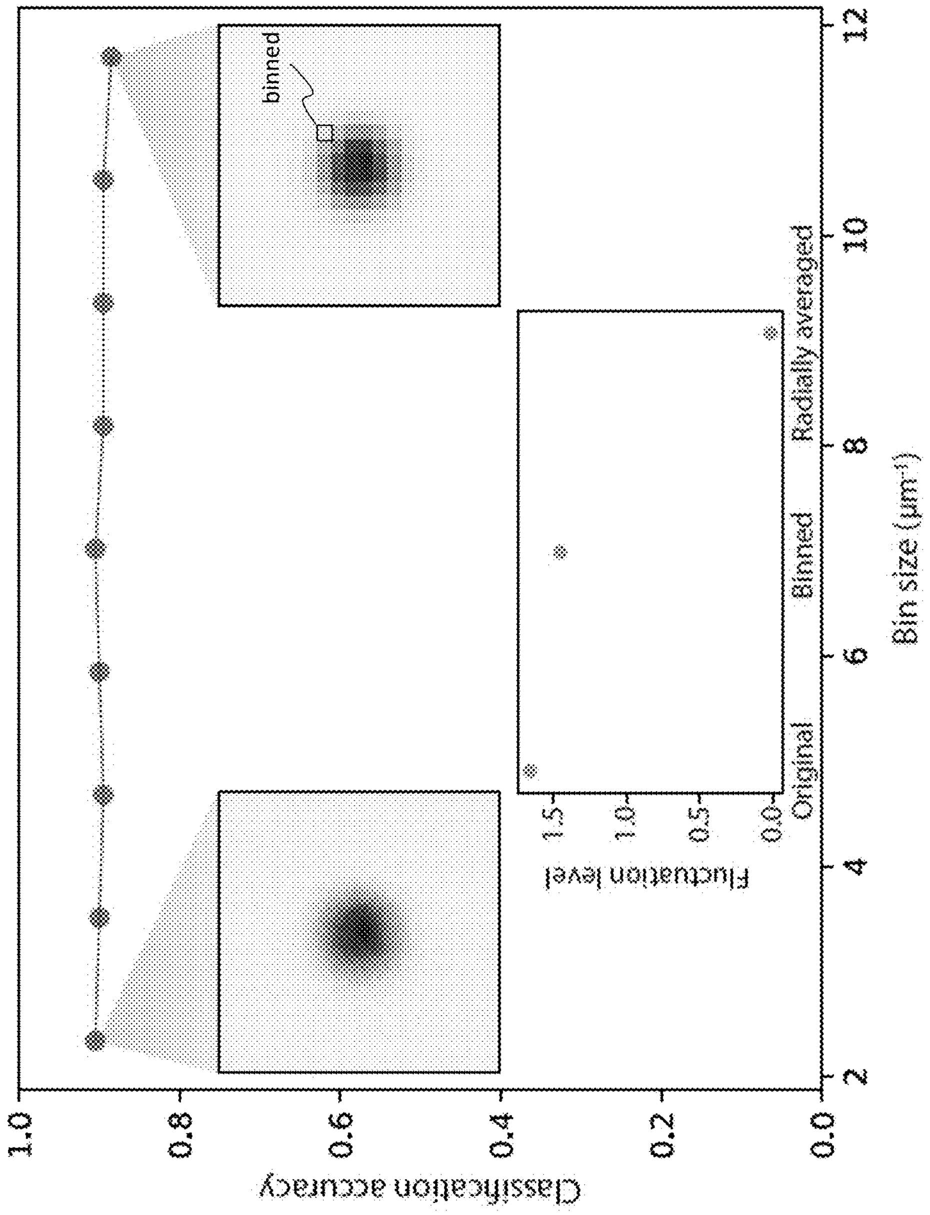
FIG. 7 depicts a schematic diagram of classification accuracies related to different bin sizes of binned images.

The blurring of adjacent pixels effectively changes subtle features in SU(N) gases due to finite optical resolution, e.g., it will decrease the measured atom number variance. This effect can be minimized by binning the data using a sufficiently large bin size. The whole image is partitioned into bins with the area of n $\mu m^{-1}$×n $\mu m^{-1}$ without overlapping. In each bin, the averaged optical density with the bin is calculated and the value is subsequently used to fill all the pixels of the bin to maintain the original size of image. Referring to FIG. 7, several different bin sizes n from 2.34 to 11.70 $\mu m^{-1}$ are tried and the result is robust against the bin size, as shown in FIG. 7. In other words, the size of the bins is not so important for affecting the classification accuracy. The inset shows the comparison of fluctuation level among the original image, binned image, and radially averaged image.

For the radially averaged images, all the pixels are divided into several bins based on the distance from the center of the atom cloud, then the pixels in the same bin are averaged. The degenerate Fermi-Dirac and Gaussian profiles are fitted by the 2D Thomas-Fermi and Gaussian distribution, respectively. It is worth noting that both density fluctuations and high-momentum information are effectively removed from both fitting cases (i.e., both density fluctuations and high-momentum information are removed in Femi-Dirac/Gaussian fitting profiles). Therefore, the comparison between Fermi-Dirac and Gaussian profiles may allow one to investigate possible next-order effects by which NNs detect the changes in $T/T_F$.

Referring to FIG. 4B, effects of filtered image for the classification accuracy by neural networks trained with original (red) experimental images and filtered (gray) experimental images can be compared according to the result of accuracy. The retraining process follows the same procedure of original training with fixed neural network parameters and hyper-parameters (e.g., the number of epochs and learning rate). In the inset, the azimuthal correlation spectrums calculated at $k=58.5\ \mu m^{-1}$ are shown. The pre-training process means that the filtered images are directed predicted by the neural network (e.g., first neural network) trained only by original (unfiltered) images and then is evaluated the accuracy by test dataset and filtered test dataset. The re-training process means the neural network (e.g., second neural network) is first trained with the filtered images and then is evaluated the accuracy by further filtered images (e.g., filtered test dataset).

In FIG. 4B, the azimuthal correlation spectrum at k=58.5 $\mu m^{-1}$ is calculated, which is defined as $$C_k(\theta_j) = \frac{\sum_i [P_k(\theta_i) P_k(\theta_{i+j})]}{\sum_i P_k^2(\theta_i)},$$

where $P_k(\theta_i)$ represents the optical density for a specific pixel at $k \sim 58.5\ \mu m^{-1}$ and angle $\sim\theta_i$. The formula can be further derived from the Fourier transform $\mathcal{F}$ as $$G = \frac{\mathcal{F}^{-1}(|F(P_k)|^2)}{|P_k|^2}.$$

The azimuthal correlation spectrum shows how the image looks like its own copy after rotating a specific angle. For a radially averaged image, the correlation becomes 1 at any angle, indicating no density fluctuations. When the image is binned, densities are only locally averaged resulting azimuthal correlation at nonzero angle<1.

Figures 5A, 5B:
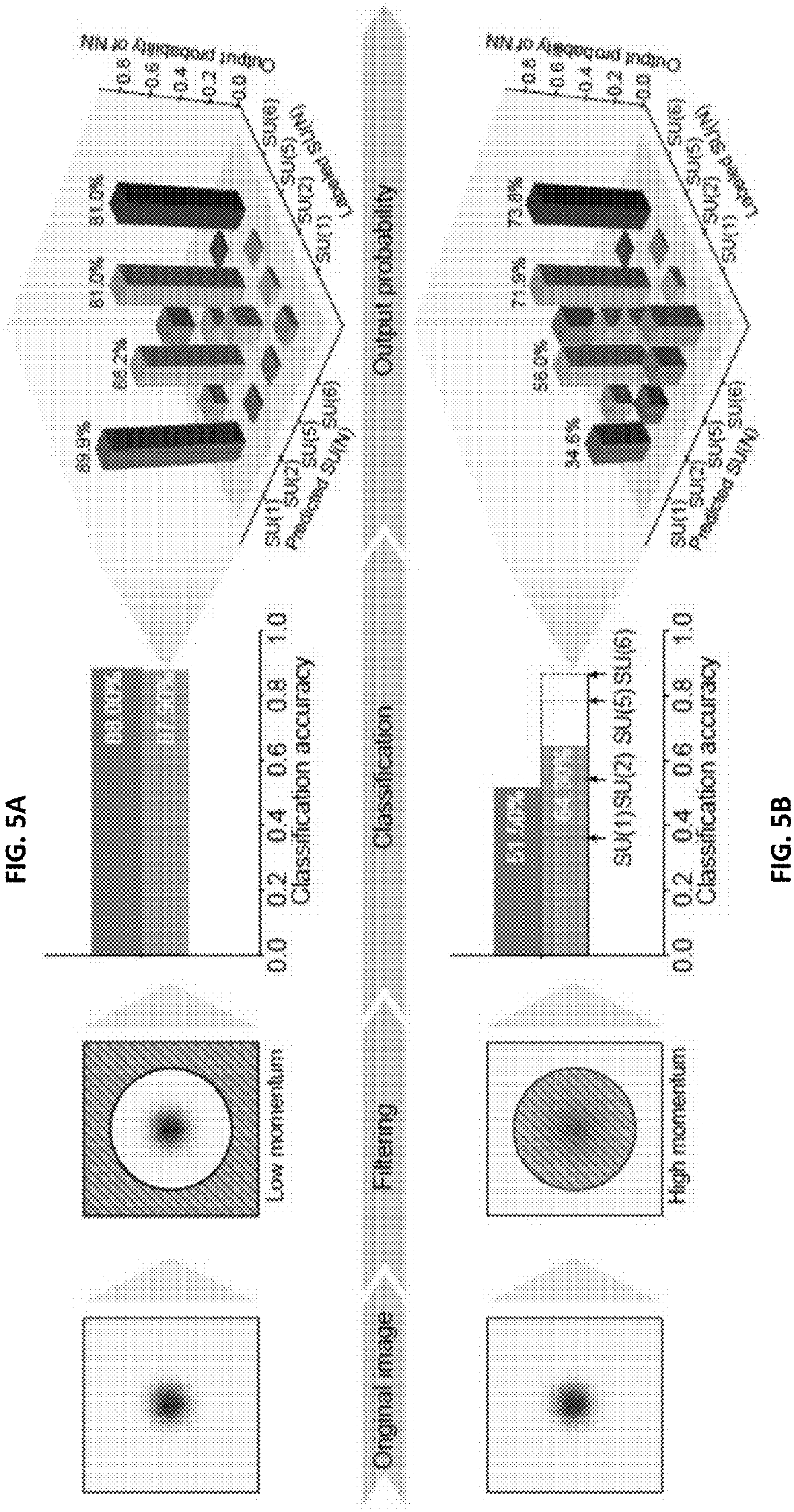
FIG. 5A and FIG. 5B respectively depict accuracy influences of low-momentum part and high-momentum part of the experimental images to the classification performed by the neural network.

During the filtering operation shown by FIG. 5A and FIG. 5B, the whole image is divided into two parts, low-momentum and high-momentum regions, based on whether the distance from the center of the atom cloud is larger than radius of cut-off momentum 70 $\mu m^{-1}$ or not. Next, one of the two parts is replaced with a fake image, which is generated by averaging the corresponding region of all the images (N=1, 2, 5, 6) in the dataset. As all the test images are same in the replaced region, the information in that replaced region can be considered as removed.

More specifically, a cutoff momentum of $k_c$ (e.g., 70 $\mu m^{-1}$) is set, such that >99% of atoms are contained within the low-momentum region (FIG. 5A), which still allows to classify the spin multiplicity with the accuracy of 88%. Although this confirms that a NN perceives spin multiplicity-dependent information in low-momentum parts, questions remain on why the accuracies are not fully recovered beyond 94%. Such observation confirms the importance of the high-momentum information. In FIG. 5B, a dataset with a high-momentum part only (k>kc=70 μm-1) is prepared, in which a low-momentum region is deliberately replaced by the same fake image. Surprisingly, the test classification accuracy is still >50% and the overall classification accuracy increases to 65% when a NN is re-trained. Such a high accuracy based on the few information of only <1% of atoms strongly implies that the high-momentum tail is crucial for determining the spin multiplicity. This SU(N)-dependent feature is not due to the finite resolution of the imaging system, as the NNs can classify the binned image with high classification accuracy. This is to confirm the accuracy on high momentum tail is actually based on atom information, not photon shot noise or other issues induced by the finite resolution of the imaging system. The binned image removes the effect induced by the finite resolution, which means if the remaining information in high momentum region is induced by the image system, the classification accuracy of binned image will also significantly drop.

High-momentum tails. In light of these results, it speculates that NNs utilize less-pronounced effects in the high-momentum part. To confirm this, the dependence of classification accuracy with the fully trained NNs on each SU(N=1, 2, 5, 6) class is checked and it is found that the classification accuracy increases with N in FIG. 5B (larger N, higher accuracy). In addition, the output probability of the correct spin multiplicity increases with N (see FIG. 5B). These results indicate that the less-pronounced feature being used in NNs becomes more prominent with increasing spin multiplicity N, which is consistent with the fact that atom-atom interactions are absent in the case of SU(1) due to the Pauli principle in the ultracold regime, while they are significantly enhanced in SU(6) fermions. Indeed, the amount of short-range interactions should be revealed in the high-momentum distribution in which the weight of such high-momentum tail is determined by the central quantity, so-called the contact, in a dilute quantum gas. The contact governs many other physical observables and has been probed in strongly interacting gases, and even in a weakly interacting gas with SU(N) symmetric interactions. It is conceivable that the NNs detect the high-momentum distribution within a single image in contrast to the previous work where hundreds of momentum-space images are statistically averaged in a $^{173}$Yb Fermi gas. To be noted, this observation is consistent with the direct measurement of the high-momentum tail in the region of $k/k_F>3$, which is corresponding to $k>100\ \mu m^{-1}$ for an SU(1) gas in the embodiment.

Figures 6A, 6B, 6C, 6D:
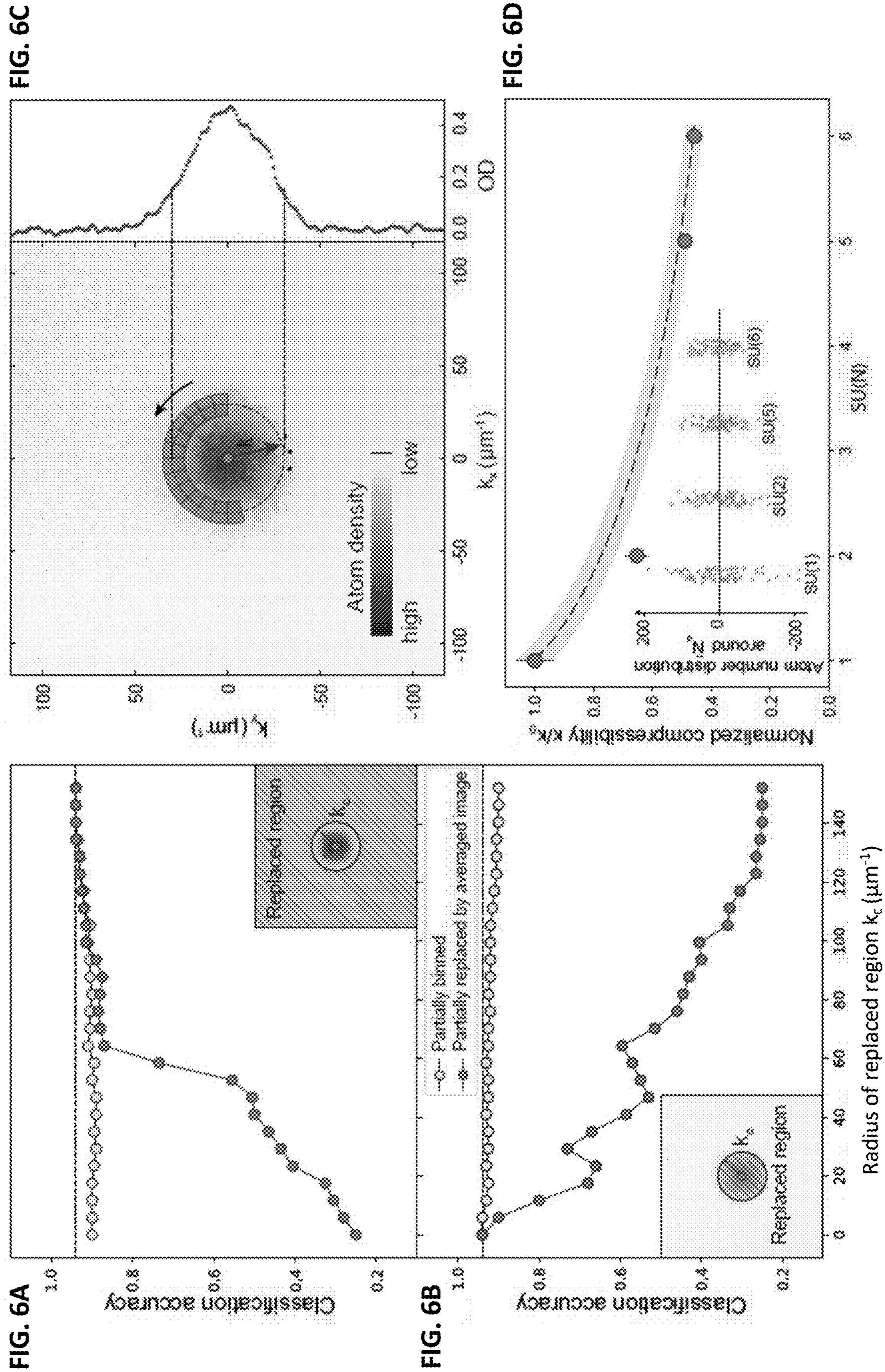
FIG. 6A and FIG. 6B respectively depict classification accuracy as a function of the cut-off momentum $k_c$ of the mask.
FIG. 6C depicts a schematic diagram of measurement of density fluctuations with a snapshot.
FIG. 6D depicts a schematic diagram of normalized compressibility $k/k_0$ of SU(N) fermions.

In FIG. 6A and FIG. 6B, the procedure is the same as in FIG. 5 with variable cutoff momenta. For the partially binned images, the corresponding mask region is replaced by a binned image.

The contributions of low-momentum part and high-momentum part is examined by classifying the masked images with the well-trained NN as shown in FIG. 5A and FIG. 5B. Referring to FIG. 5A and FIG. 5B, Red and gray bars represent the accuracy of pre-trained and re-trained NNs, respectively. Retraining of the neural networks with only high-momentum part or low-momentum part enhances the accuracy as shown by gray bars. For high-momentum parts, classification accuracy increases with N as shown in black ticks in FIG. 5B, where the average of the four investigated SU(N) cases is 64.30%.

This is motivated by the observation that the classification accuracy significantly decreases with filters, with various fitting functions that remove the SU(N)-dependent effect in the high-momentum tail. Two different types of masks for the region of the replacements, which will be referred as edge mask and central mask, respectively. The edge mask covers from the edge of the image to some atomic cut-off momentum $k_c$, whereas the central mask covers from the center to $k_c$. Then, the masked region is replaced with a fake image generated by averaging the corresponding region of all the images in the dataset and re-evaluate the test accuracies of the pre-trained NN.

In other words, in the low momentum mask operation, the central mask is replaced by a fake image, wherein the fake image is generated by averaging all experimental images' central mask region images of dataset corresponding to the experimental image; and in the high momentum mask operation, the edge mask is replaced by a further fake image, wherein the further fake image is generated by averaging all experimental images' edge mask region images of dataset corresponding to the experimental image.

Reason of replacing: Without replacing the mask region, the images will be totally different from the original images. For example, with the central masks, the high momentum region only contains less than 1% of the total atoms. In this case, the neural network trained on the original images may not recognize the image correctly.

Return to FIG. 2, in step S270, the processor 110 inputs the filtered test datasets into the trained first neural network, so as to obtain one or more first classification accuracies respectively corresponding to the filtered test datasets.

After the second neural network is well trained by the filtered training datasets, in step S280, the processor 110 inputs the filtered test datasets into the trained second neural network, so as to obtain one or more second classification accuracies respectively corresponding to the filtered test datasets.

Next, in step S290, the processor 110 identifies the differences between first pairs of the standard classification accuracy and the first classification accuracies, second pairs of the standard classification accuracy and the second classification accuracies and third pairs of the first classification accuracies and the second classification accuracies.

Referring to FIG. 4B, for an example regarding the information removed by Gaussian fitting profile filtering operation, a standard classification accuracy is 94.00% and a first classification accuracy of the first NN (which is trained by original training dataset) tested by filtered test dataset generated by Gaussian fitting profile is 25.00%, and the difference between this first pair accuracies is 94–25=69%; a second classification accuracy of the second NN (which is trained by filtered training dataset generated by Gaussian fitting profile) tested by filtered test dataset generated by Gaussian fitting profile is 60.10%, and the difference between this second pair accuracies is 94-60.1=33.9%; and the difference between this third pair accuracies is 25–60.1=–35.1%. For an further example regarding the information removed by Binned image filtering operation, a standard classification accuracy is 94.00% and a first classification accuracy of the first NN tested by filtered test dataset generated by Binned image is 90.00%, and the difference between this first pair accuracies is 94–90=4%.

Next, in step S300, the processor 110 determines impact level of each information preserved or removed by each of the filtering operations according to the differences, wherein information which has higher impact level more affect accuracy of the first neural network and the second neural network.

For example, regarding the first NN (pre-trained NN), the accuracy difference related to binned image filtering operation is 4% and the accuracy difference related to gaussian fitting profile filtering operation is 69%. In this case, the processor 110 determines that impact level of information removed by the gaussian fitting profile is higher than a further impact level of information removed by the binned image. In other words, comparing the information removed by the Gaussian fitting filtering operation and the information removed by the Binned image filtering operation, the information removed by the Gaussian fitting filtering operation affect the classification accuracy of the first neural network more since it has higher impact level. Such that, while generating the experimental data in the future, one or more the information with higher impact level serve as a guidance for the high-sensitivity image analysis of the quantum system with the neural network. For example, one or more the information with higher impact level are kept and one or more other information with lower impact level are removed, so as to improve the efficiency and accuracy of the classification operation performed by the neural network. After the impact level of each information is obtained, it can be known that what information is different among different classes and design experiment or analysis to explore these properties in the quantum system. In the quantum system of the embodiment, these properties are contact and density fluctuation, which are N dependent. That is, unlike other cases without using the provided method, the valuable physical property can be selected from many irrelevant properties more efficiently when handling/analyzing a quantum system with limited prior knowledge. It also validates which theoretical model (in this case, Gaussian distribution/Fermi Dirac distribution) is more consistent with the experimental result.

After the impact level of each information preserved or removed by each of the filtering operations is determined. The processor 110 can further identifies correlations between the thermodynamic observables and each of the information preserved or removed by each of the filtering operations according to the determined impact level of each of the information, such that the correlations can be further focused with analytical efforts. Specifically, first, by comparing the difference of classification accuracy and also images before and after filtering, the importance of the information preserved or removed is determined. For example, when we compare the original image, binned image and radially averaged image, it is determined that the azimuthal density fluctuation is very important for the classification, which means it should be N-dependent. Then, analytical efforts can be focused on the azimuthal density fluctuation and develop a scheme to extract the thermodynamic observables (compressibility) from the azimuthal density fluctuation of single experimental image like FIG. 6C. This validates that the azimuthal density fluctuation contains the N-dependent thermodynamic observables.

For example, the processor 110 may further finds out the answer for question that to what dominant feature classifies spin multiplicity in the low-momentum regime. Based on the significant decrease of the accuracy with profiles being radially averaged in FIG. 4B, it is assumed that the NNs utilize the density fluctuation along the azimuthal direction for classification. The amount of azimuthal density fluctuations can be revealed in the correlation spectrum (FIG. 4B) showing a strong signal in the original and binned images, while flattened at all angles for the radially averaged images.

To understand how the density fluctuations reveal spin multiplicity, considering the fluctuation-dissipation theorem by which the thermodynamic compressibility $$\kappa = \frac{1}{n^2}\frac{\partial n}{\partial \mu}$$

can be measured through density fluctuations (i.e., atom number fluctuations), where n is the local density and $\mu$ the local chemical potential. For repulsively interacting SU(N) fermions, it is known that the compressibility $\kappa$ decreases with increasing spin multiplicity N as $$(\kappa/\kappa_0)^{-1} = 1 + \frac{2}{\pi}(k_F a_s)(N-1)(1+\epsilon k_F a_s),$$

where $\kappa_0$ is the compressibility of an ideal Fermi gas and $$\epsilon = \frac{2}{15\pi}(22 - 4\ln 2).$$

Here, the atom number fluctuations are further suppressed by the Pauli blocking in the degenerate regime showing sub-poissonian fluctuations as $$\sigma_{N_a}^2 / \overline{N_a} \propto k_B T,$$

where $N_a$ indicates the atom number measured in the small volume. Therefore, one finds the relative atom number fluctuation $$\sigma_{N_a}^2 / \overline{N_a}$$

is given as $$\sigma_{N_a}^2 / \overline{N_a} = n k_B T_K = \frac{3}{2}\frac{T/T_F}{1 + \frac{2}{\pi}k_F a_s(N-1)(1+\epsilon k_F a_s)}.$$

In the performed experiment, an atomic sample ballistically expands from the harmonic trap preserving occupation statistics of the phase space during the expansion. Instead of repeatedly producing identical samples and monitoring a small region at the certain position, the relative atom number fluctuations can be extracted along the azimuthal bins containing the same number of atoms on average (therefore, resulting in equivalent optical density) within a single image, even though a grouping of ideally equivalent bins is challenging and the fluctuation measurement is susceptible to the systematic variations. The successful classification of the spin multiplicity with NNs can provides a guidance to subsequently investigate the atom number fluctuations with conventional analysis.

To verify this less-pronounced feature, choosing a series of bins containing ~450 atoms on average in a line-of-sight integrated density profile along the azimuthal direction (as shown by FIG. 6C, which is the schematic about how to extract the density fluctuation from snapshots) and analyzing the statistics. To have a sufficiently large number of bins for statistical analysis, the measurements are performed at varying momenta on the ring with $$(k_x^2 + k_y^2)^{1/2} \simeq 28\mu m^{-1}$$

around the center of the distribution. Both the temperature and spin multiplicity are known to affect the atomic-density fluctuations through the change in compressibility.

Therefore, relative atom fluctuations are normalized by the temperature as $$\zeta_{SU(N)} = \frac{\sigma_{N_a}^2}{\overline{N_a}} / \frac{T}{T_F}$$

to reveal SU(N) interaction effect from a single snapshot. In FIG. 6D, the statistical value of $\zeta_{SU(N)}/\zeta_{SU(1)}$ is plotted. This measurement indeed reveals the normalized thermodynamic compressibility $\kappa/\kappa_0 = \zeta_{SU(N)}/\zeta_{SU(1)}$ showing the enhanced interaction $k_F a_s(N-1)$. The error bar indicates the standard error from 150 different density profiles. Referring to FIG. 6D, the dashed line indicates the theory curve $$\kappa/\kappa_0 = \left[1 + \frac{2}{\pi}k_F a_s(N-1)(1+\epsilon k_F a_s)\right]^{-1}$$

with the uncertainty represented by the shaded region considering the SE of $\zeta_{SU(1)}$. The inset shows the distribution of the atom number per bin from three images for each spin multiplicity. The distribution is plotted around the average normalized by the degenerate temperature, $$(N - \overline{N_a}) / (T/T_F), \text{ where } \overline{N_a}$$

is the average atom number.

Whereas the scaling of the measured density fluctuation with N is in good agreement with theoretical prediction, experimental results for SU(N>1) lie systematically below theoretical ones. The discrepancy may be due to interactions that remain finite during the expansion, which could slightly perturb the occupation statistics of the phase space. Considering the fact that the change of the compressibility is not significant for N=5 and 6 in FIG. 6D, the high classification accuracy of NNs using the low-momentum part highlights the superior capabilities of a single snapshot approach using ML. In contrast to the conventional analysis that focuses on a single observable, NNs take a holistic approach in utilizing multiple features simultaneously. The provided method of measurement is consistent with recent experiments in which thermodynamics is studied by monitoring the density fluctuations and expansion dynamics in degenerate $^{87}Sr$ atoms.

Referring to FIG. 6D (FIG. 6D is the result of density fluctuation/compressibility), is shows density fluctuations measured along azimuthal bins containing the same number of atoms within a single image. Total 24 bins are chosen at the distance of 22~34 $\mu m^{-1}$ from the center of the atom cloud. Redundant pixels are removed at the border to keep all bins having the same number of pixels. The size of each bin is much larger than the optical resolution of the imaging system.

The bins are selected within single images along azimuthal directions like shown in FIG. 6C. The total number of bins cannot be too large or too small. If this number is too small, there will be not enough bins to calculate the fluctuation. If this number is too large, the pixel number contained in each bin will be quite small and the blurring of adjacent pixels due to finite optical resolution can effectively change the density fluctuation.

If the distance from the center of the cloud is too closed to the center of atom cloud, the pixel number is not enough to calculate the density fluctuation. If it is too far away from the center of the atom cloud, the OD/atom number is too low.

For a further example (evaluating detection accuracy with tunable masks), for examining the less-pronounced effects in both the low-momentum and high-momentum regions, and building up the concrete connections between these less-pronounced effects and the spin multiplicity, the processor 110 quantitatively analyzes the changes inflicted on the test accuracies when the cutoff momentum $k_c$ is tuned over. It is clearly shown in FIG. 6A that the test accuracy decreases to ~25% by complete replacements of the images by the same average image. This accuracy is gradually recovered up to almost 90% when $k_c$ is increased to $k_c \simeq 70\ \mu m^{-1}$ being consistent with the result in FIG. 4B, as less information from the low-momentum region is removed. Based on replacement analysis, it is conceivable that SU(N)-dependent features must exist in the low-momentum part. In comparison, the classification accuracy of the binned images (bin size=5.85 $\mu m^{-1}$) does not decrease too much, which is only a partial removal of fluctuations. As a complementary study, the processor 110 utilizes the central mask and replaces the low-momentum information up to a variable momenta of $k_c$ in FIG. 6B. The classification accuracy gradually decreases with increasing $k_c$ from 0 to ~50 $\mu m^{-1}$, as the information within the density profile is increasingly removed. However, the classification accuracy stays over 50% around $k_c$=50~70 $\mu m^{-1}$, which strongly suggests that the high-momentum tails of the density distribution still contribute towards the classifications based on SU(N). Beyond $k_c$=80 $\mu m^{-1}$, where the atomic shot-noise becomes comparable to the background shot-noise level, the test accuracy rapidly drops for the images replaced by averaged images.

To scrutinize the effects of SU(N) symmetric interactions, it is provided the NN with altered images and probed specific attributes of the profiles independently. It found that the high-momentum tail and density fluctuation information significantly contribute to the SU(N) classification process. First of all, the high-momentum tails of atomic-density distributions are expected to exhibit Tan's contact, which encapsulates the many-body interactions through the set of universal relations. Although the previous work required averaging of hundreds of images for the detection of the SU(N)-dependent contact, the NN's ability makes it possible to obtain the single-image distinguishability of the SU(N) class after training.

The second dominant feature for the SU(N) classification is the density fluctuation within the profile. Both the temperature and spin multiplicity are known to affect the atomic-density fluctuations through the change in compressibility. Sub-poissonian density distributions have been observed in degenerate Fermi gases of atoms and molecules, where multiple images were used to obtain the statistics. The suppression of the density fluctuation was also observed in SU(N) fermions allowing for the thermodynamic study. For a single image, there exists multiple sets of density fluctuation measurements at varying momentum, where each measurement forms a ring around the center of the distribution. Considering the decreased SU(N) classification accuracy from the radially averaged datasets, the fluctuation information might have been utilized in addition to the contact, to reflect the effects of compressibility. Lastly, it is found that the low-energy (low momentum) part of the density profile does not exhibit a signature as strong as the previous two features.

In conclusion, it is demonstrated that the capabilities of the proposed method by classifying SU(N) Fermi gases with their time-of-flight (TOF) density distributions. The NN provides classifications with an accuracy well beyond the conventional methods such as principal components analysis. By applying different types of manipulations, it is also found that the NNs combine the features from a high-momentum signal and density fluctuations together, to distinguish SU(N).

Based on above, the provided method can be used to guide the thermodynamic studies in the density profile of ultracold fermions interacting within SU(N) spin symmetry prepared in a quantum simulator. Although such spin symmetry should manifest itself in a many-body wavefunction, it is elusive how the momentum distribution of fermions, the most ordinary measurement, reveals the effect of spin symmetry. Using the provided fully trained convolutional neural network (NN) with a remarkably high accuracy of ~94% for detection of the spin multiplicity, how the accuracy depends on various less-pronounced effects with filtered experimental images can be investigated. Guided by the provided method, a thermodynamic compressibility from density fluctuations within the single image can be directly measured. Furthermore, the provided method shows a potential to validate theoretical descriptions of SU(N) Fermi liquids, and to identify less-pronounced effects even for highly complex quantum matter with minimal prior understanding.

The above exemplary embodiment and operations serve only as illustration of the present invention, an ordinarily skilled person in the art will appreciate that other structural and functional configurations and applications are possible and readily adoptable without undue experimentation and deviation from the spirit of the present invention.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for analyzing experimental data related to a quantum system by using neural network by an electronic device, comprising:

generating a training dataset according to initial experimental data (S210);

performing one or more filtering operations on the training dataset to generate one or more filtered training datasets respectively corresponding to the one or more filtering operations (S220);

training a first neural network by inputting the training dataset into the first neural network (S230);

training a second neural network by inputting the one or more filtered training datasets into the second neural network (S240);

inputting a test dataset into the trained first neural network, so as to obtain a standard classification accuracy of the trained first neural network, wherein the test dataset is generated from further experimental data (S250);

performing the one or more filtering operations on the test dataset to generate one or more filtered test datasets (S260);

inputting the one or more filtered test datasets into the trained first neural network, so as to obtain one or more first classification accuracies respectively corresponding to the one or more filtered test datasets (S270);

inputting the one or more filtered test datasets into the trained second neural network, so as to obtain one or more second classification accuracies respectively corresponding to the one or more filtered test datasets (S280);

identifying differences between first pairs of the standard classification accuracy and the one or more first classification accuracies, second pairs of the standard classification accuracy and the one or more second classification accuracies and third pairs of the one or more first classification accuracies and the one or more second classification accuracies (S290); and determining impact level of each information preserved or removed by each of the one or more filtering operations according to the differences, wherein information having a higher impact level has a greater effect on accuracy of the first neural network and the second neural network (S300), such that, while generating future experimental data, one or more the information with the higher impact level are kept and one or more other information with lower impact level are removed, so as to improve classification efficiency and classification accuracy of the neural network.

2. The computer-implemented method of claim 1, wherein each of the first neural network and the second neural network comprises:

an input layer, wherein an experimental image of the training dataset, the one or more filtered training datasets, the test dataset and the one or more filtered test datasets is inputted to the first neural network or the second neural network by the input layer;

a convolutional layer, connected from the input layer, comprising 24 different kernels, wherein size of each kernel is set to 24, and a stride of said each kernel is set to 1;

an activation function layer, connected from the convolutional layer, wherein activation function of the activation function layer is ReLU function;

an average pooling layer, connected from the activation function layer, wherein size of pooling area is 2×2 and stride of the pooling area is 1;

a dropout layer, connected from the average pooling layer, wherein dropout percentage is 50%;

a fully connected layer, connected from the dropout layer, comprising 4 neurons;

a further activation function layer, connected from the fully connected layer, wherein activation function of the further activation function layer is Softmax function; and an output layer, wherein the output layer outputs a predicted classification result.

3. The computer-implemented method of claim 2, wherein each experimental image inputted to the first neural network or the second neural network is generated by performing time-of-flight (TOF) experiment on a SU(N) fermion, wherein said each experimental image has a size of 201×201 pixels, and the predicted classification result comprises one of following classes: SU(1), SU(2), SU(5) and SU(6), and outputs a probability of the predicted classification result.

4. The computer-implemented method of claim 1, wherein the one or more filtering operations comprise:

a binned image operation;

a radially averaged image operation;

a Fermi-Dirac fitting profile operation;

a Gaussian fitting profile operation;

a low momentum mask operation; and a high momentum mask operation.

5. The computer-implemented method of claim 4, wherein each of the training dataset, the one or more filtered training datasets, the test dataset, and the one or more filtered test datasets includes one or more experimental images and one or more labels respectively corresponding to the one or more experimental images, wherein each of the one or more labels indicates a class to which the corresponding experimental image belongs, and the method further comprising:

in the Fermi-Dirac fitting profile operation or the Gaussian fitting profile operation, any information except for fitting parameters is removed;

in the radially averaged image operation, information of azimuthal density fluctuation is removed and most of information located at a high momentum region is also removed;

in the low momentum mask operation, information located at a low momentum region is removed, wherein a central mask covers a region from a center to a cut-off circle of the corresponding experimental image, and the cut-off circle has radius of predetermined cut-off momentum $k_c$, wherein atom density at the center of the corresponding experimental image is largest;

in the high momentum mask operation, the information located at the high momentum region is removed, wherein an edge mask covers a region from an edge to the cut-off circle of the corresponding experimental image; and in the binned image operation, information of density fluctuation is partially removed.

6. The computer-implemented method of claim 5, the method further comprising:

in the low momentum mask operation, replacing the central mask by a fake image, wherein the fake image is generated by averaging central mask region images of all experimental images in a dataset including the corresponding experimental image; and in the high momentum mask operation, replacing the edge mask by a further fake image, wherein the further fake image is generated by averaging edge mask region images of said all experimental images in the dataset including the corresponding experimental image.

7. The computer-implemented method of claim 1, wherein the initial experimental data is prepared by following steps:

preparing degenerate SU(N) Fermi gases with predetermined value of N respectively in optical traps, wherein N=1, 2, 5, 6; and taking, after time-of-flight expansion, spin-insensitive absorption images of the degenerate SU(N) Fermi gases as experimental images, so as to record density profiles of the degenerate SU(N) Fermi gases, wherein each experimental image shows atoms momentum distribution via each experimental image's density profile.

8. The computer-implemented method of claim 7, wherein generating the training dataset according to the initial experimental data comprises:

regarding said each experimental image of the initial experimental data, identifying a value of N of the degenerate SU(N) Fermi gas corresponding to said each experimental image;

generating a label of said each experimental image according to the identified value of N; and integrating the generated label and said each experimental image into the training dataset.

9. The computer-implemented method of claim 8, wherein the density profile of said each experimental image contains momentum-space information of the degenerate SU(N) Fermi gases, and the momentum-space information reflects thermodynamic observables comprising Tan's contact and compressibility, such that spin multiplicity of each of the degenerate SU(N) Fermi gases is predicted according to the thermodynamic observables.

10. The computer-implemented method of claim 9, the method further comprising:

identifying correlations between the thermodynamic observables and said each information preserved or removed by said each of the one or more filtering operations according to the determined impact level of said each information.

11. An electronic device for analyzing experimental data related to a quantum system by using neural network, comprising:

a data communication circuit, configured to receive initial experimental data from an experimental device; and a processor, configured to execute machine instructions to implement a method to analyze the initial experimental data related to the quantum system by using the neural network, and the method comprises:

generating a training dataset according to the initial experimental data (S210);

performing one or more filtering operations on the training dataset to generate one or more filtered training datasets respectively corresponding to the one or more filtering operations (S220);

training a first neural network by inputting the training dataset into the first neural network (S230);

training a second neural network by inputting the one or more filtered training datasets into the second neural network (S240);

inputting a test dataset into the trained first neural network, so as to obtain a standard classification accuracy of the trained first neural network, wherein the test dataset is generated from further experimental data (S250);

performing the one or more filtering operations on the test dataset to generate one or more filtered test datasets (S260);

inputting the one or more filtered test datasets into the trained first neural network, so as to obtain one or more first classification accuracies respectively corresponding to the one or more filtered test datasets (S270);

inputting the one or more filtered test datasets into the trained second neural network, so as to obtain one or more second classification accuracies respectively corresponding to the one or more filtered test datasets (S280);

identifying differences between first pairs of the standard classification accuracy and the one or more first classification accuracies, second pairs of the standard classification accuracy and the one or more second classification accuracies and third pairs of the one or more first classification accuracies and the one or more second classification accuracies (S290); and determining impact level of each information preserved or removed by each of the one or more filtering operations according to the differences, wherein information having a higher impact level has a greater effect on accuracy of the first neural network and the second neural network (S300), such that, while generating future experimental data, one or more the information with the higher impact level are kept and one or more other information with lower impact level are removed, so as to improve classification efficiency and classification accuracy of the neural network.

12. The electronic device of claim 11, wherein each of the first neural network and the second neural network comprises:

an input layer, wherein an experimental image of the training dataset, the one or more filtered training datasets, the test dataset and the one or more filtered test datasets is inputted to the first neural network or the second neural network by the input layer;

a convolutional layer, connected from the input layer, comprising 24 different kernels, wherein size of each kernel is set to 24, and a stride of said each kernel is set to 1;

an activation function layer, connected from the convolutional layer, wherein activation function of the activation function layer is ReLU function;

an average pooling layer, connected from the activation function layer, wherein size of pooling area is 2×2 and stride of the pooling area is 1;

a dropout layer, connected from the average pooling layer, wherein dropout percentage is 50%;

a fully connected layer, connected from the dropout layer, comprising 4 neurons;

a further activation function layer, connected from the fully connected layer, wherein activation function of the further activation function layer is Softmax function; and an output layer, wherein the output layer outputs a predicted classification result.

13. The electronic device of claim 12, wherein each experimental image inputted to the first neural network or the second neural network is generated by performing time-of-flight (TOF) experiment on a SU(N) fermion, wherein said each experimental image has a size of 201×201 pixels, and the predicted classification result comprises one of following classes: SU(1), SU(2), SU(5) and SU(6), and outputs a probability of the predicted classification result.

14. The electronic device of claim 11, wherein the one or more filtering operations comprise:

a binned image operation;

a radially averaged image operation;

a Fermi-Dirac fitting profile operation;

a Gaussian fitting profile operation;

a low momentum mask operation; and a high momentum mask operation.

15. The electronic device of claim 14, wherein each of the training dataset, the one or more filtered training datasets, the test dataset, and the one or more filtered test datasets includes one or more experimental images and one or more labels respectively corresponding to the one or more experimental images, wherein each of the one or more labels indicates a class to which the corresponding experimental image belongs, and the method further comprises:

in the Fermi-Dirac fitting profile operation or the Gaussian fitting profile operation, any information except for fitting parameters is removed;

in the radially averaged image operation, information of azimuthal density fluctuation is removed and most of information located at a high momentum region is also removed;

in the low momentum mask operation, information located at a low momentum region is removed, wherein a central mask covers a region from a center to a cut-off circle of the corresponding experimental image, and the cut-off circle has radius of predetermined cut-off momentum $k_c$, wherein atom density at the center of the corresponding experimental image is largest;

in the high momentum mask operation, the information located at the high momentum region is removed, wherein an edge mask covers a region from an edge-to the cut-off circle of the corresponding experimental image; and in the binned image operation, information of density fluctuation is partially removed.

16. The electronic device of claim 15, wherein the method further comprises:

in the low momentum mask operation, replacing the central mask by a fake image, wherein the fake image is generated by averaging central mask region images of all experimental images in a dataset including the corresponding experimental image; and in the high momentum mask operation, replacing the edge mask by a further fake image, wherein the further fake image is generated by averaging edge mask region images of said all experimental images in the dataset including the corresponding experimental image.

17. The electronic device of claim 11, wherein the initial experimental data is prepared by following steps:

preparing degenerate SU(N) Fermi gases with predetermined value of N respectively in optical traps, wherein N=1, 2, 5, 6; and taking, after time-of-flight expansion, spin-insensitive absorption images of the degenerate SU(N) Fermi gases as experimental images, so as to record density profiles of the degenerate SU(N) Fermi gases, wherein each experimental image shows atoms momentum distribution via each experimental image's density profile.

18. The electronic device of claim 17, wherein generating the training dataset according to the initial experimental data comprises:

regarding said each experimental image of the initial experimental data, identifying a value of N of the degenerate SU(N) Fermi gas corresponding to said each experimental image;

generating a label of said each experimental image according to the identified value of N; and integrating the generated label and said each experimental image into the training dataset.

19. The electronic device of claim 18, wherein the density profile of said each experimental image contains momentum-space information of the degenerate SU(N) Fermi gases, and the momentum-space information reflects thermodynamic observables comprising Tan's contact and compressibility, such that spin multiplicity of each of the degenerate SU(N) Fermi gases is predicted according to the thermodynamic observables.

20. The electronic device of claim 19, wherein the method further comprises:

identifying correlations between the thermodynamic observables and said each information preserved or removed by said each of the one or more filtering operations according to the determined impact level of said each information.

* * * * *